US006347773B1

(12) United States Patent
Gross et al.

(10) Patent No.: US 6,347,773 B1
(45) Date of Patent: Feb. 19, 2002

(54) SHOP SUPPORT STAND

(76) Inventors: Raymond N. Gross, 228 East St., Easthampton, MA (US) 01027; Thomas F. Laprade, 38 Dwight St., Hatfield, MA (US) 01038

( * ) Notice: Subject to any disclaimer, the term of this patent is extended or adjusted under 35 U.S.C. 154(b) by 0 days.

(21) Appl. No.: 09/481,659

(22) Filed: Jan. 11, 2000

Related U.S. Application Data

(63) Continuation-in-part of application No. 09/104,370, filed on Jun. 25, 1998, now abandoned, which is a continuation of application No. 08/231,769, filed on Apr. 25, 1994, now abandoned.

(51) Int. Cl.[7] .......................... F16M 11/00; B25H 1/00

(52) U.S. Cl. ............................... 248/176.1; 248/179.1; 248/168; 144/286.1; 144/287

(58) Field of Search .......................... 248/176.1, 441.1, 248/459, 460, 118, 464, 165, 166, 168, 170, 440.1, 177.1, 178.1, 179.1, 188.91; 144/286.1, 286.5, 287

(56) References Cited

U.S. PATENT DOCUMENTS

| | | | | |
|---|---|---|---|---|
| 2,222,078 A | * | 11/1940 | Kroeger et al. | 182/129 |
| 2,740,513 A | * | 4/1956 | Sullivan | 193/35 R |
| 3,583,588 A | * | 6/1971 | Royal, Sr. | 414/654 |
| 4,501,080 A | * | 2/1985 | Rich | 38/102.7 |
| 4,681,370 A | * | 7/1987 | Vancil | 297/405 |
| 4,974,651 A | | 12/1990 | Carmon et al. | 144/286 R |
| 5,184,795 A | * | 2/1993 | Sexton | 248/118 |
| 5,247,976 A | | 9/1993 | Matthews | 144/287 |
| 5,299,656 A | | 4/1994 | Grill | 182/181 |
| 5,337,875 A | | 8/1994 | Lee | 193/35 R |
| 5,435,411 A | | 7/1995 | Borgatti | 182/181 |

OTHER PUBLICATIONS

"Outfeed Support", *ShopNotes*, vol. 5, Issue 25, p. 21 (Jan. 1996).

* cited by examiner

*Primary Examiner*—Anita King
(74) *Attorney, Agent, or Firm*—McCormick, Paulding & Huber LLP

(57) ABSTRACT

A shop support stand for slidingly supporting a generally horizontally moving workpiece, such a length of wood, at a preselected height as a work operation, such as sawing, routing, milling or planing, is performed on the workpiece. The shop support stand can receive a moving dropped end of the workpiece and ramp the dropped end to the preselected height. The shop support stand includes a base and a ramp having a convex surface. The ramp mounts with the base, and the convex surface includes an upper portion for slidingly supporting the workpiece at the preselected height and a lower portion for slidingly ramping the dropped end of the workpiece to the upper portion.

20 Claims, 5 Drawing Sheets

SHOP SUPPORT STAND

CROSS REFERENCE TO RELATED APPLICATIONS

This application is a continuation-in-part of application Ser. No. 09/104,370, filed Jun. 25, 1998 now abandoned, which is in turn a continuation of application Ser. No. 08/231/769, filed Apr. 25, 1994, now abandoned, both of which are herein incorporated by reference.

FIELD OF THE INVENTION

The present invention relates to a shop support stand for supporting a workpiece, such as a piece of wood, as it overhangs and moves relative to a piece of work equipment, such as a tablesaw, radial arm saw, planer, etc., that is performing a work operation on the workpiece.

BACKGROUND OF THE INVENTION

A piece of work equipment, such as a table saw, milling machine, planer, etc., is often used to perform work operations on unwieldy workpieces that are of a dimension larger than any support table or structure that is integral with the work equipment. Hence a portion of the workpiece overhangs the work equipment, and this portion can change as the workpiece is moved toward or away from the work equipment as the work operation progresses. It is often advantageous to additionally support the workpiece as it moves toward or away from a piece of work equipment, as the overhanging portion of the workpiece can exert considerable leverage and interfere with the work operation, such as by causing a saw to cut less accurately, or by causing the workpiece to bind against the saw, etc.

Known in the art are cylindrical and roller ball type shop support stands for supporting workpieces. These support stands are typically located a selected distance away from the work equipment so as to receive and support the overhanging portion of the workpiece. These known shop support stands have drawbacks.

For example, cylindrical rollers can run the workpiece off to one side if the centerline of the cylinder is not exactly perpendicular to the direction of movement of the workpiece. This can be a particular problem when the support stand is separate from the work equipment, such that the perpendicularity of the cylinder axis cannot by constantly assured via the fixed mounting the cylinder to the piece of work equipment. Maintaining perpendicularity can be even more of the problem due to the side bumping of the roller by the workpiece.

Ball rollers also have disadvantages. For example, a narrow workpiece can fall between the balls, rendering the ball roller stand virtually worthless for supporting the workpiece.

In addition, often the weight of the portion of the workpiece that overhangs the work equipment causes an end of the workpiece to drop. Cylindrical and ball roller support stands can deal with very little drop before the workpiece, as it moves away from the work equipment, simply hits the stand instead of riding up over the ball rollers or the cylindrical roller, and tends to knock the stand over. For example, a typical cylinder of a cylinder roller stand has a 2" diameter, such that the workpiece can only drop 1" between the work equipment and the stand before it hits the center of the cylinder and tends to push the stand rather than roll over the roller. Ball rollers typically allow even less drop. Often the stand must be properly positioned relative to the work equipment each time before a new type of workpiece is worked on to ensure that the workpiece does not drop too much before reaching the stand. Often, if the drop is to be large, for instance when the workpiece is long and flexible and is to be sawn along its length, the stand must be moved fairly close to the work equipment, and a second stand used to support and portion of the workpiece that over hangs the first stand. A third stand can even be required.

Shop support stands that combine a sloped portion having a single slope and cylindrical or ball rollers are also known. While these stands can accommodate a larger drop than the cylindrical roller or ball rollers alone, they typically retain one or more of the aforementioned other disadvantages of ball and cylindrical rollers, Furthermore, the sloped portion, having a single slope, is limited in the amount of drop that can be accommodated without the stand becoming fairly large. Also, the workpiece contacts the top of the sloped portion essentially along a line, which can lead to excessive pressure and hence wear on the sloped portion of any low friction coating applied thereto, as well as increased resistance to the movement of the workpiece.

Finally, known shop stands can include a considerable number of parts and can be unduly expensive and complicated.

Accordingly, it is an object of the present invention to address one or more of the foregoing drawbacks of the prior art.

SUMMARY OF THE INVENTION

According to the invention, there is provided a shop support stand for slidingly supporting a generally horizontally moving workpiece, such a length of wood, at a preselected height as a work operation, such as sawing, routing, milling or planing, is performed on the workpiece. The shop support stand can receive a moving dropped end of the workpiece and ramp the dropped end to the preselected height. The shop support stand includes a base and a ramp having a convex surface. The ramp mounts with the base, and the convex surface includes an upper portion for slidingly supporting the workpiece at the preselected height and a lower portion for slidingly ramping the dropped end of the workpiece to the upper portion.

DETAILED DESCRIPTION OF THE PREFERRED EMBODIMENTS

Figure 1:
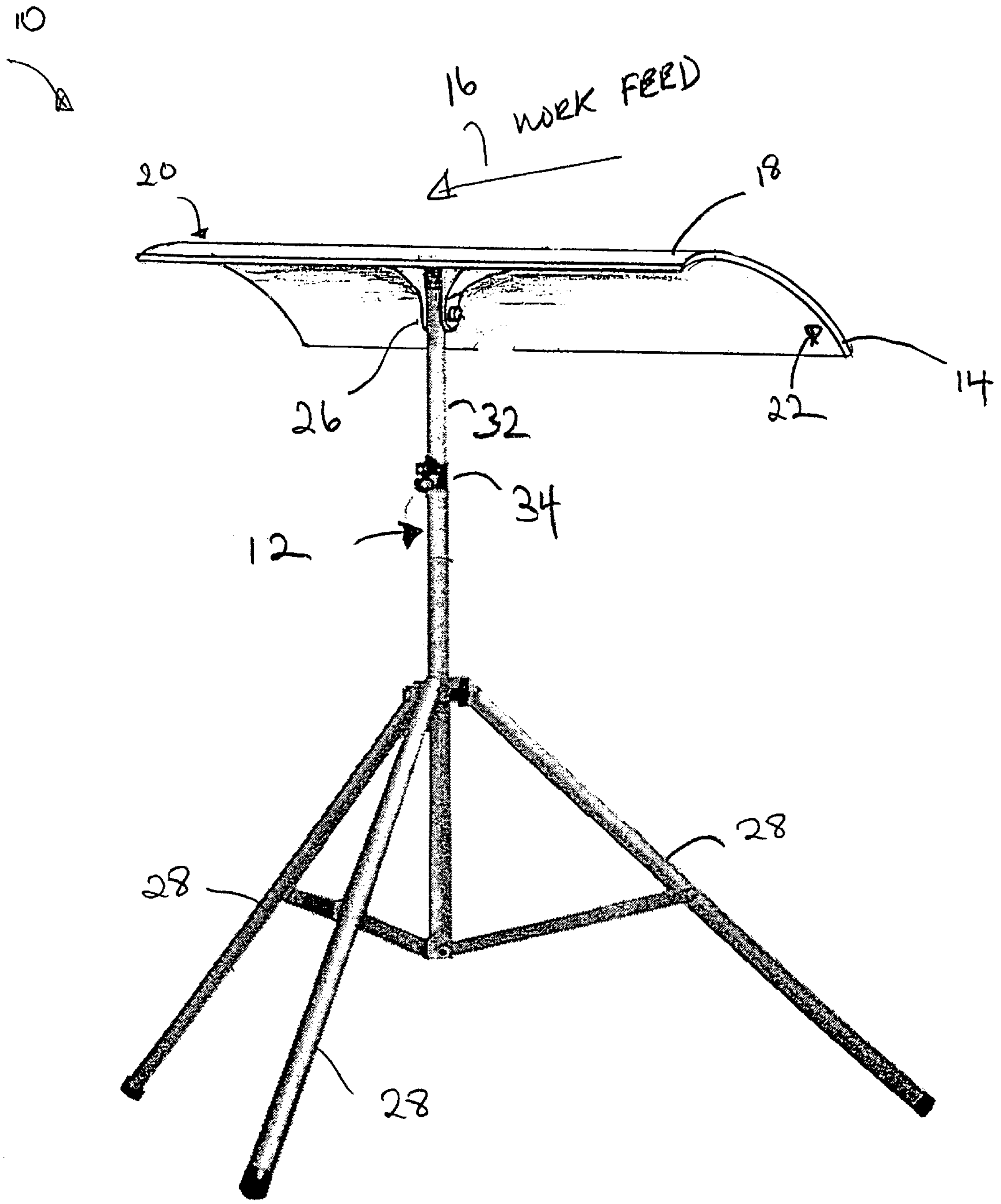
FIG. 1 is a perspective view of one embodiment of a shop support stand according to the present invention.

FIG. 1 illustrates one embodiment of a shop support stand 10 according to the present invention. The shop support stand 10 includes a base 12 and a ramp 14 mounted with the base 12 for slidingly supporting a workpiece, such as a length of wood, at a preselected height as the workpiece moves generally in the horizontal direction, as indicated by reference numeral 16. The workpiece typically moves in the direction 16 as work operations, such as sawing, routing, milling or planing, are performed on the workpiece.

The ramp 14 includes a convex and preferably slippery surface 18. The surface 18 includes an upper portion 20 for slidingly supporting the workpiece at the preselected height and a lower portion 22 for slidingly ramping a dropped end of the workpiece to the upper portion 20 so as to support the workpiece at the preselected height as the workpiece moves in the horizontal direction. As shown in FIG. 1, it is preferable that the post 32 mount with the ramp 14 at a location adjacent the upper portion 20 of the ramp 14.

The slippery surface 18 of the ramp 14 allows the workpiece not only to slide perpendicular to the ramp surface 14, that is, in the direction indicated by reference numeral 16 in FIG. 1, but also parallel, i.e. sideways, so as to prevent any forced misalignment of the workpiece.

The ramp 14 can be pivotably mounted with the base 12 by a pivot mechanism 26. Pivoting the ramp 14 allows the ramp angle to be adjusted, which can be necessary to compensate for various characteristics of the workpiece and/or uneven ground surfaces on which the base 12 is placed. When supporting a workpiece, the ramp 14 should be relatively fixed relative to the vertical axis of the base 12, such as by tightening the pivoting mechanism 26, so as to maintain the proper orientation of ramp 14 to the workpiece, though precise orientation is typically not critical to the function of the invention. The ramp 14 could be secured to the base 12 by clamping or pinning.

Preferably, as illustrated in FIG. 1, the ramp is mounted relative to the base 12 such that the upper portion 20 of the ramp 14 can provide an area that is substantially flat so as to have little or no slope in the vertical direction relative to the horizontal direction for more broadly supporting the workpiece. With continuing reference to FIG. 1, the lower portion 22 of the ramp has a steeper slope in the vertical direction relative to the horizontal direction than the upper portion 20 for ramping the workpiece up to the upper portion 20 and reducing the overall size of the ramp 14.

The ramp can include a plastic for providing the slippery surface 18. One plastic found to be suitable is a high molecular weight polyethylene plastic. In one preferred embodiment, the ramp 14 includes a sheet of high molecular weight polyethylene plastic adhered to a convex metal frame. The plastic can be the ultra high molecular weight polyethylene available from Can-Do National Tape, Inc., P.O. Box 40366, Nashville Tenn. 37204. This plastic is available as a sheet having a thickness in the range of 20–30 thousandths of an inch, and with a pressure sensitive adhesive on one side of the plastic sheet, which can be used to adhere the plastic to the metal frame.

The convex surface 18 can be defined by a single radius of curvature or by more than one radius of curvature. In one embodiment of the invention, the upper portion 20 of the surface 18 is defined by a radius of curvature of approximately 6", and the lower portion 22 of the surface 18 is defined by a radius of curvature of approximately 12".

The base 12 shown in FIG. 1 is a collapsible, telescoping tripod base that, while not essential to the operation of the present invention, is considered to enhance the utility thereof. The three legs 28 provide a stable platform, and the legs fold up such that shop support stand 10 can be easily and compactly transported as well as be lightweight and easily adjusted. This base is considered to be advantageous over a conventional four-legged bases, which can be unduly heavy and which can rock under load. The post 32 slidingly engages the locking mechanism 34 such that the vertical height of the ramp 14 can be adjusted and set for varying the preselected height at which the work piece is supported.

Figure 2:
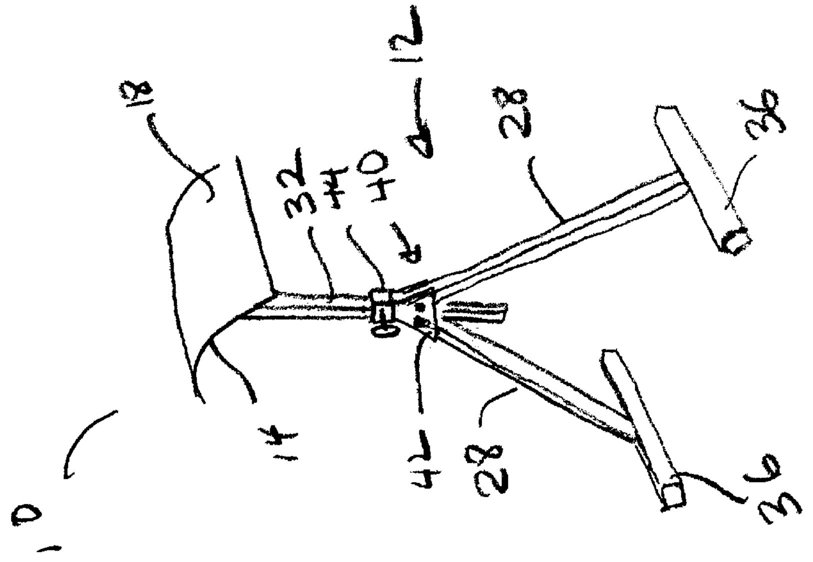
FIG. 2 is a perspective view of another embodiment of a shop support stand according to the present invention.

FIG. 2 illustrates an alternative embodiment of the invention, wherein the base 12 includes a pair of extended legs 28, each having a foot member 36, and a post 32 having the ramp 14 mounted at one end thereof. Each foot member 36 generally extends transversely to the leg 28 to which it is attached. The legs 28 are pivotably coupled together at the first end 40 of the pair, such as by the plate and pins 42, and the end 40 slidingly receives the other end of the post 32, such as by the tube and set screw assembly 44. For storing or transporting the shop support stand, the legs 28 can be folded such that the legs 28 and the post 32 are substantially parallel, and the ramp 14 can be removed from the end of the post 32, the post 32 slid downward, and the ramp 14 secured between the post 32 and one of the legs 28, as shown in the perspective view of FIG. 3A and the elevational view of FIG. 3B. The backside 46 of the ramp 14 mounts a pair of ramp clips 48 having retaining ends 50, which are generally directed out of the page in the case of FIG. 3B, for engaging the post 32 so as to more securely hold the ramp 14 between the post 32 and one of the legs 28. The ramp 14 also includes a socket 54 for slidingly receiving the top of the post 32 for mounting the ramp 14 with the base 12. The socket can include triangular brackets 56 for securing the post to the underside 46 of the ramp 14 and for engaging the side of the post 32, as shown in FIG. 3A so as to, in cooperation with the ramp clips 48, securing the ramp 14 between the post 32 and one of the legs 28.

Figure 3A:
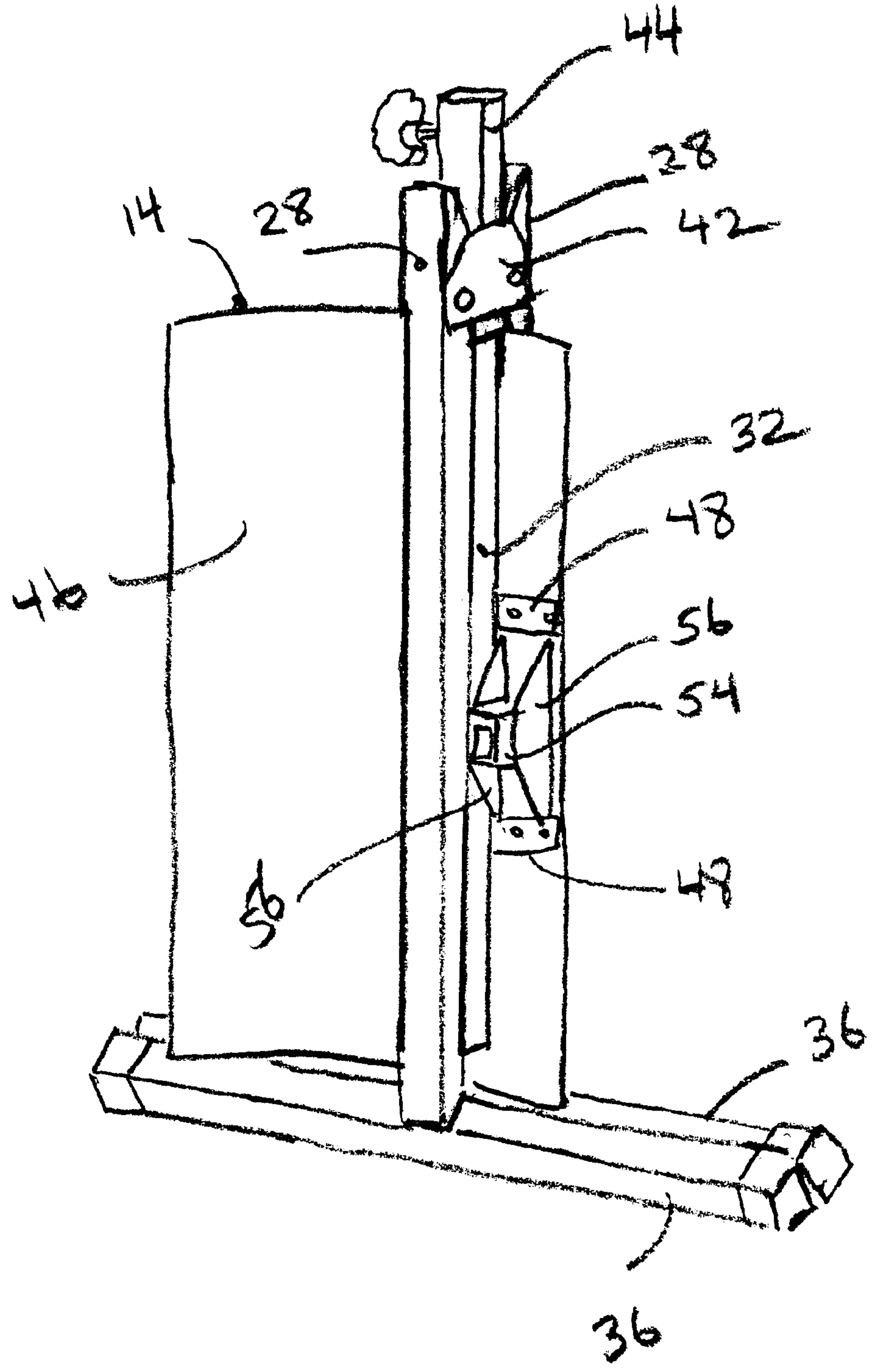
FIG. 3A is a perspective view of the shop support stand of FIG. 2 with the legs folded and the ramp placed between the one of the legs and the post.
Figure 3B:
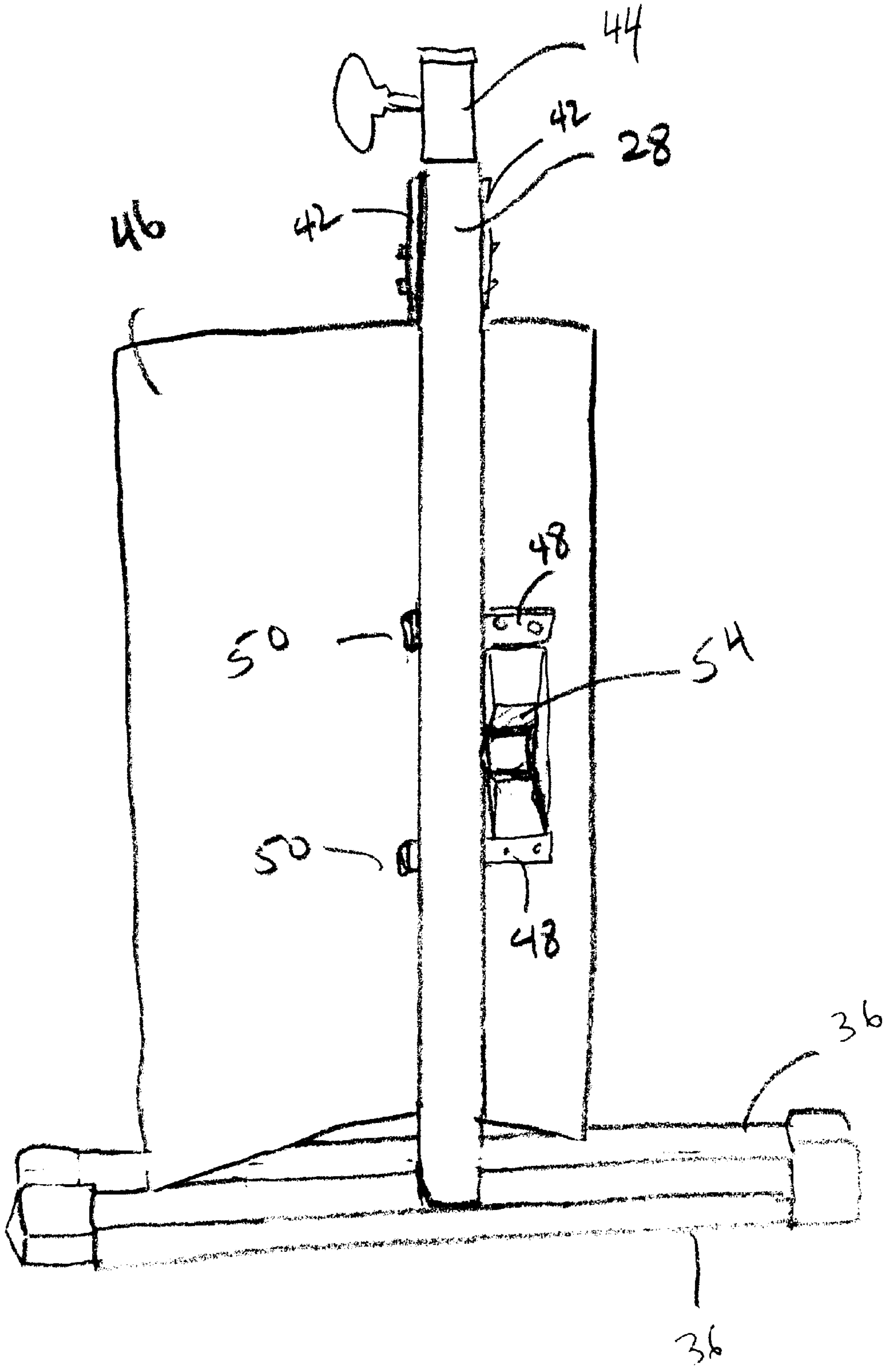
FIG. 3B is elevational view of the shop support stand of FIG. 3A.

Note that the shop support stand 10 can stand upright when the legs 28 are folded and the ramp 14 is between said post 32 and one of the legs 28, as shown in FIGS. 3A and 3B.

Figure 4:
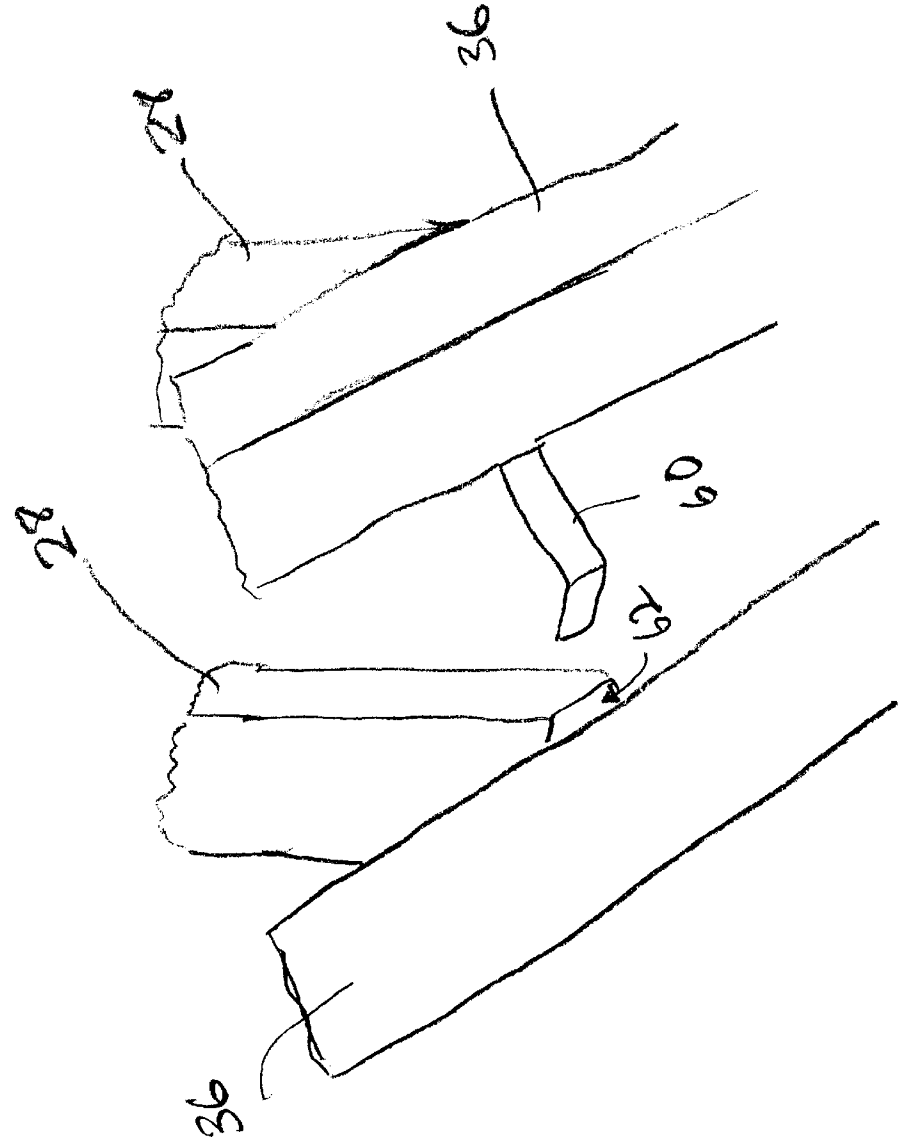
FIG. 4 is a view of the bottom end of the pair of legs of the base of the shop support stand of FIGS. 2, 3A and 3B, illustrating a slot in one legs and a locking clip coupled to the other leg.

As shown in FIG. 4, one of the legs 28 can include a locking clip 60 for engaging the other of the legs 28 for securing the legs 28 together when the pair of legs is folded as shown in FIGS. 3A and 3B. The other of the legs 28 can define a slot 62 for receiving the locking clip 60 for facilitating the securing of the legs 28 in the folded position.

The pair of legs 28, including the foot elements 36 and the plate and pins 42 and the tube and set screw assembly 44, shown in FIGS. 2 to 4, are available from Crawford Products Inc., 301 Winter Street, West Hanover, Mass. 02339-0702. The locking clip can be fabricated by modifying the model 2-C clip available from Arthur I. Platt Co., 160 Rock Lane, Milford, Conn. 06460.

The post 32 and socket 54 can be fabricated from carbon steel square tube. For example, the post 32 can be 1"×16 gage square tube and the socket 54 can be 1¼"×11 gage square tube. Such tube is known in the art and is available from a number of suppliers. Typically, the post and socket are plated with zinc.

According to the invention, in certain embodiments extensions can be provided for each side of the ramp for allowing the use of the shop support stand of the present invention with wider workpieces. If a narrower ramp is desired, the sides of the ramp, in certain embodiments, can be trimmed with a saw.

Various embodiments of the invention are disclosed above. However, it is to be understood that such embodiments are intended as illustrative of apparatus for practicing the invention and not as limiting. One of ordinary skill in the art, with knowledge of the teachings herein, can envision variations of the apparatus disclosed herein that encompass and accomplish the purpose of the invention and are considered within the scope thereof. For example, although a tripod base and the two-legged base are shown in the accompanying Figures, one could fashion many other functional bases, such as by appropriately affixing the ramp of the present invention to a sawhorse, though significant advantages of the tripod or the two-legged base maybe lost.

Having described the invention, what is claimed as new and secured by Letters Patent is:

1. A shop stand for supporting an overhanging portion of an inanimate workpiece, said shop stand being spaced from a workstation upon which said workpiece is being subjected to one of a cutting, a planing, a sanding, a routing, a machining and a modifying operation, said shop stand comprising:

a base assembly; and a curved ramp having a convex upper surface and an underside surface, said convex upper surface selectively engaging with and supporting said over hanging workpiece portion; and wherein said base assembly is mated to said underside of said ramp for selectively maintaining said convex upper surface at a predetermined height relative to said workstation whereby said overhanging workpiece portion will slide along said convex upper surface and rest thereon when said workpiece is moved in a direction away from said workstation and towards said shop stand.

2. The shop support stand of claim 1 wherein said upper surface of said ramp provides an area that is substantially flat so as to have little or no slope in a vertical direction relative to a horizontal direction, a lower portion of said upper surface having a steeper slope in the vertical direction relative to the horizontal direction than said upper section of said ramp.

3. The shop support stand of claim 1 wherein said ramp includes a plastic provided to said upper surface.

4. The shop support stand of claim 3 wherein said plastic includes a high molecular weight polyethylene plastic.

5. The shop support stand of claim 1 wherein said ramp includes a sheet of high molecular weight polyethylene plastic adhered to a convex metal base, said plastic for providing said upper surface for slidingly supporting the workpiece.

6. The shop support stand of claim 1 wherein said upper surface is defined by a single radius of curvature.

7. The shop support stand of claim 1 wherein said upper surface is defined by at least two radii of curvature.

8. The shop support stand of claim 1 wherein said ramp pivotably mounts to said base.

9. The shop support stand of claim 1 wherein said ramp includes a socket for slidingly mounting said ramp to said base.

10. The shop support stand of claim 1 wherein said base includes a pair of legs and a post slidingly coupled to said pair of legs and for the mounting of said ramp to said base for supporting the workpiece, said pair of legs pivotably coupled such that said legs may be folded to be substantially parallel to said post.

11. The shop support stand of claim 10 wherein one end of one of said legs includes a clip for engaging the other of said legs for securing the legs together when said pair of legs is folded.

12. The shop support stand of claim 11 wherein the other of said legs includes a slot for receiving said clip to facilitate the securing of said stand in the folded position.

13. The shop support stand of claim 10 wherein said base includes a pair of foot elements, each of said pair of foot elements attached to a different one of said pair of legs and extending transversely to the leg to which it is attached.

14. The shop support stand of claim 10 wherein said ramp includes a ramp clip for engaging one of said post and one of said legs when said ramp is removed being mounted to said post for supporting the workpiece and placed between one of said legs and said post and said pair of legs is folded.

15. The shop support stand of claim 10 wherein said ramp mounts to said base by mounting to one end of said post, and wherein said ramp includes a socket for slidingly receiving said one end of said post.

16. A shop support stand for slidingly supporting a generally horizontally moving workpiece at a preselected height as work operations, including sawing, routing, milling or planing, are performed on the workpiece, supporting including receiving a moving dropped end of the workpiece and ramping the dropped end to the preselected height, comprising:

a base;

a ramp for mounting with said stand, said ramp including a surface having an upper portion for slidingly supporting the workpiece at the preselected height and a lower portion for slidingly ramping the dropped end of the workpiece to the upper portion, said lower portion having a first slope in a vertical direction relative to a horizontal direction that is steeper than a second slope in the vertical direction relative to the horizontal direction of said upper portion.

17. The shop support stand of claim 16 wherein said ramp includes a high molecular weight polyethylene plastic provided to said ramp surface.

18. The shop support stand of claim 16 wherein said ramp includes a ramp clip and wherein said base includes a post for the mounting of said ramp thereto and a pair of extended legs, said pair of legs having a first end pivotably coupled together and slidingly receiving an end of said post, wherein said legs can be folded such that said legs and post are substantially parallel and said ramp can be removed from said post and secured between the post and one of said legs by the engagement of said ramp clip with said post for storage or transportation of said shop support stand.

19. The shop support stand of claim 18 wherein said ramp includes a socket for slidingly receiving one end of said post for said mounting of the ramp with said base, and wherein when said ramp is removed from said post and secured between said post and said one of said legs, said socket can engage said post so as to further secure said ramp between said post and said one of said legs.

20. A shop support ramp for slidingly supporting a generally horizontally moving workpiece, including at a preselected height as work operations, sawing, routing, milling or planing, are performed on the workpiece, supporting including receiving a moving dropped end of the workpiece and ramping the dropped end to the preselected height, comprising:

a surface having an upper portion for slidingly supporting the workpiece at the preselected height and a lower portion for slidingly ramping the dropped end of the workpiece to the upper portion, said lower portion having a first slope in a vertical direction relative to a horizontal direction that is steeper than a second slope in the vertical direction relative to the horizontal direction of said upper portion; and means for mounting said ramp with a base.

* * * * *